Dec. 19, 1950     T. A. WILLSON     2,534,748
SUNGLASSES
Filed June 25, 1949
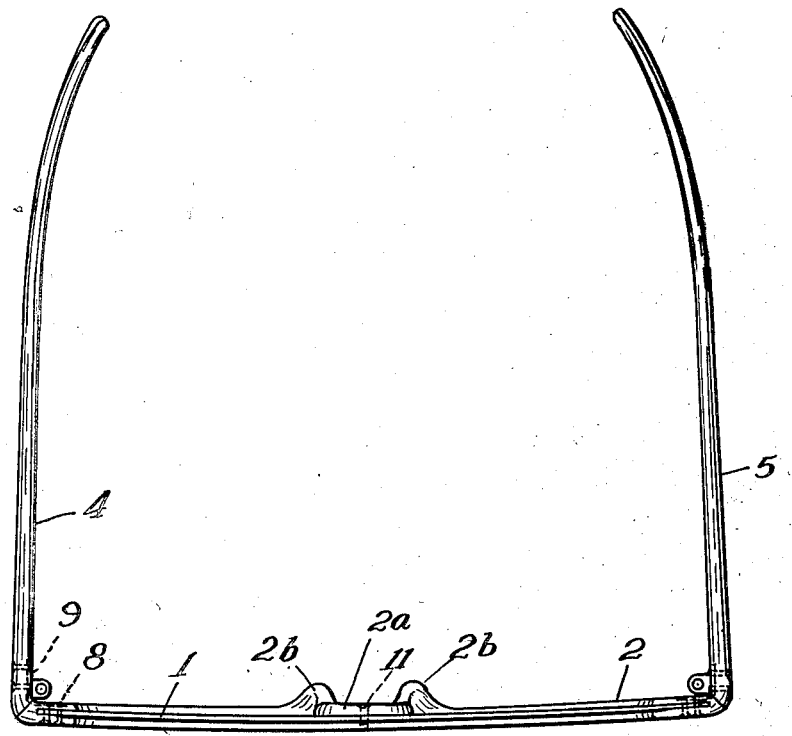
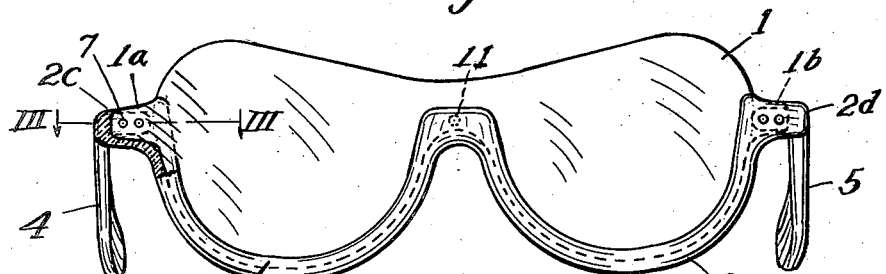
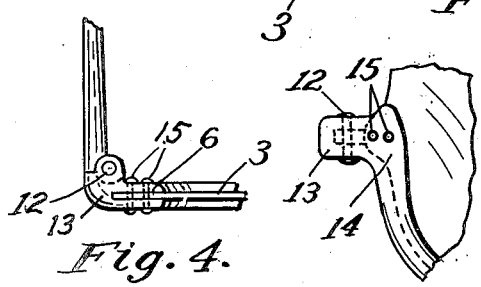
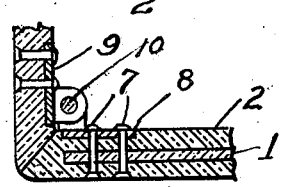
Inventor
*Thomas A. Willson*
By *W. F. & M. Stewart*
Attorneys Patented Dec. 19, 1950

2,534,748

UNITED STATES PATENT OFFICE 2,534,748

SUNGLASSES

Thomas A. Willson, Wyomissing, Pa., assignor to Willson Products, Inc., Reading, Pa., a corporation of Pennsylvania Application June 25, 1949, Serial No. 101,353

3 Claims. (Cl. 2—14)

This invention relates to ophthalmic mountings and, more particularly, to a new and improved construction of eyeglasses, especially of the sunglass type, including a lens framing and lens sheet of such configuration as to provide not only an attractive but very sturdy pair of sunglasses.

A common type of partial lens framing is the so-called "brow bar" type comprising framing encircling only the upper half portions of the lenses. This construction has the disadvantage of lack of simplicity in design and manufacture, particularly insofar as the nose piece is concerned. Furthermore, the lower sharp edges of the lenses oftentimes come into contact with the wearer's cheeks, causing discomfort.

An improved form of spectacles of this general type comprises one in which the framing encircles the lower half instead of the upper half of the lens structure, and wherein the lenses comprise a single sheet of plastic material, particularly in the case of sunglasses. An outstanding difficulty of construction arises in the assembly or attachment of the lens sheet to the framing. The usual procedure is to insert a perimetrical portion of the lens sheet into a grooved portion of the framing and to provide glue or other adhesive to form a bond between the sheet and such grooved portion. It has been found that such bond is not very reliable, particularly when sunglasses are roughly handled, resulting in detachment of the lens from the framing.

An object of the present invention is to provide a novel eyeglass construction, particularly useful as sunglasses, and of the type wherein only the lower halves of the lenses are encircled by framing, but which is devoid of the aforesaid disadvantages.

A more specific object of this invention is to provide sunglasses of the type wherein the lower half of the lens structure is encircled by framing, wherein the lens is so shaped and attached to the framing in such a manner as to provide a very rigid bond between the lens and framing so that the lens is not detachable from the framing even as the result of application of substantial pulling forces.

Other objects and advantages of my invention will become apparent from a study of the following specification, taken with the accompanying drawing wherein:

Fig. 1 is a top view of a pair of sunglasses embodying the principles of the present invention;

Fig. 2 is a front elevational view with a portion cut away of the sunglasses shown in Fig. 1;

Fig. 3 is an enlarged cross-sectional view taken along line III—III of Fig. 2;

Fig. 4 is a fragmentary plan view shown broken away of a modification of the lens sheet attaching means shown in Fig. 2, and Fig. 5 is an enlarged fragmentary front view of the structure shown in Fig. 4.

Referring more particularly to Figs. 1 and 2 of the drawing, numeral 1 denotes a single lens sheet of clear or dark glass, or of plastic material, particularly if the eyeglasses are of the sunglass type. Lens sheet 1 comprises a unitary sheet shaped so as to provide both lenses and a bridging portion therebetween as will be apparent from Fig. 2 of the drawing. Sheet 1 is fitted into a grooved portion of a lens framing 2, which framing is of somewhat sinuous shape, surrounding only the lower half rims of the lens portions of sheet 1. A groove 3 is formed along the entire upper edge of the lens framing and snugly encloses the lower perimetrical or rim portion of the lens sheet 1. The lens framing includes a nose piece 2a and a pair of rests 2b, the latter adapted to rest on the wearer's nose to provide comfort in the wearing of the glasses. Temples 4 and 5 are pivotally connected to the extremities of the lens framing 2 adjacent the central or near-top portion of the sides of the glasses.

A normal method of bonding of the lens sheet 1 to the lens framing 2 comprises the interposition of cement or glue in the groove 3, thereby providing a bond between the lower perimetrical portion of the sheet 1 and the framing. In many instances, however, particularly as the result of rough usage of the sunglasses, this glued connection is inadequate, since pulling of sheet 1 from the framing 2 is likely to cause separation of these parts.

An important feature of the present invention resides in the provision of a rigid and reliable connection or bond between the lens sheet and framing which is devoid of such tendency of separation or detachment. This is provided by having integral ears or lugs 1a and 1b extending from the sides of the lens sheet, which lugs may be inserted in a grooved portion 6 of the lens framing forming a continuation of the groove 3. Such grooved portion 6 is formed in ear portions 2c and 2d of the lens framing. Ear portions 1a and 1b of the lens sheet are rigidly secured to the framing 2 by means of rivets or pins 7 which extend through both the lens framing and ear portions 1a and 1b of the lens sheet. The inner ends of the rivets 7 firmly secure a hinge plate 8 to the framing 2, which together with the other hinge plate 9 riveted to the temples and hinged at 10 forms a pivotal connection between the lens framing 2 and temples 4 and 5. Thus it will be seen that the rivets 7 have a dual function, namely, they secure the hinge plate to the lens framing 2 and rigidly fasten the lens sheet 1 to the lens framing 2. Such rivet connection is provided at both pivotal connections of the temples, thereby very securely attaching the lens sheet to the framing and overcoming any tendency for these parts to separate, even after pulling the lens sheet away from such framing with substantial force.

If desired, glue, cement or other adhesive material also may be provided in the grooved portion of the lens framing, although this is not necessary in most cases because of the rigid connection between the ear portions of the lens sheet and lens framing provided by rivets 7. In some instances, it may be desirable to provide an additional pin 11 which extends through the nose piece 2a of the framing and the bridging portion of lens sheet 1, thus rigidly connecting together the central portion of the lens sheet and framing. Such pin may be extended either through the front or rear portion of the nose piece as desired. It will be noted that the nose piece is somewhat flattened at the top and provided with a grooved portion which is of greater depth than the remainder of the lens framing so as to provide a greater amount of surface contact between the sheet and framing and a more rigid connection therebetween and at the same time allowing a greater width and therefore strength of the bridge portion of the lens sheet.

Figs. 4 and 5 show a modified form of pivotal connection for a plastic lens framing in the form of a vertically extending pin 12 which extends through the plastic hinge portions 13 of the framing. In this modification, the ear portions 14 of the lens sheet are secured to the framing by means of rivets 15 which are completely separate from the hinge instead of forming supporting means for the hinge structure as in the case of the embodiment shown in Fig. 2.

It should be noted that my novel type of connection is applicable not only to the type of sunglasses shown, but to the "brow bar" type, as well.

Thus it will be seen that I have provided a novel, attractive and sturdy pair of glasses, particularly useful as sunglasses, wherein the parts are positively and rigidly secured together so as to avoid any possibility of detachment thereof, even as a consequence of rough usage or pulling, therefore giving relatively long life to sunglasses, and wherein the attaching rivets have the dual function of firmly securing both lens sheet and temple hinges to the framing.

While I have illustrated and described certain specific embodiments of my invention, it will be apparent that these are by way of illustration only, and that various changes and modifications may be made within the contemplation of my invention and within the scope of the following claims.

I claim:

1. An ophthalmic mounting comprising an integral lens framing of substantially sinuous shape and including a groove disposed along its inner edge portion along substantially the entire length thereof, a single lens sheet shaped in accordance with the contour of said lens framing and the lower rim portion of which extends into said groove, said lens sheet projecting upwardly from the uppermost portions of said lens framing and adapted to cover both eyes of the wearer, said sheet having integral ears extending from the sides thereof, said framing having corresponding ear portions including grooves forming an extension of said groove, a pair of temples pivotally mounted to said framing ear portions, and means extending through said ear portions of said framing and lens sheet ear portions for rigidly attaching the lens sheet to the framing.

2. A pair of glasses having a single lens sheet shaped so as to provide both lenses and an inner connecting integral bridge portion, a lens framing encircling substantially half of the rim of said lens sheet and having integral ear portions extending from the sides thereof, said lens sheet also having integrally extending ear portions fitted into said ear portions of the lens framing, and rivet means extending through both the ear portions of said framing and the ear portions of said lens sheet so as to firmly attach the lens sheet to the frame.

3. A pair of sunglasses having the construction such as recited in claim 2, together with hinge means for pivotally mounting a pair of temples to said ear portions of said lens framing wherein a hinge plate portion of said hinges is firmly attached to said lens framing ear portions by said rivet means.

THOMAS A. WILLSON.

REFERENCES CITED

The following references are of record in the file of this patent:

UNITED STATES PATENTS

| Number | Name | Date |
|---|---|---|
| 956,690 | Donaldson | May 3, 1910 |
| 2,397,243 | Cooper, Jr. | Mar. 26, 1946 |